(12) United States Patent
Mori et al.

(10) Patent No.: US 11,863,092 B2
(45) Date of Patent: Jan. 2, 2024

(54) CONTROL DEVICE

(71) Applicant: NIDEC CORPORATION, Kyoto (JP)

(72) Inventors: Tomonari Mori, Kanagawa (JP); Linfeng Lan, Kanagawa (JP); Ryo Itaba, Kyoto (JP); Yasuki Kobayashi, Kanagawa (JP)

(73) Assignee: NIDEC CORPORATION, Kyoto (JP)

( * ) Notice: Subject to any disclaimer, the term of this patent is extended or adjusted under 35 U.S.C. 154(b) by 20 days.

(21) Appl. No.: 17/598,873

(22) PCT Filed: Jan. 17, 2020

(86) PCT No.: PCT/JP2020/001454
§ 371 (c)(1),
(2) Date: Sep. 28, 2021

(87) PCT Pub. No.: WO2020/202707
PCT Pub. Date: Oct. 8, 2020

(65) Prior Publication Data
US 2022/0158578 A1 May 19, 2022

(30) Foreign Application Priority Data
Mar. 29, 2019 (JP) .................. 2019-068241

(51) Int. Cl.
*H02K 23/00* (2006.01)
*H02K 39/00* (2006.01)
(Continued)

(52) U.S. Cl.
CPC ............... *H02P 23/04* (2013.01); *H02P 6/10* (2013.01); *H02P 21/22* (2016.02); *H02P 23/16* (2016.02)

(58) Field of Classification Search
CPC .......... H02P 23/04; H02P 21/22; H02P 23/16; H02P 6/10
(Continued)

(56) References Cited

U.S. PATENT DOCUMENTS 8,378,615 B2    2/2013  Tazawa et al.
2005/0238335 A1*  10/2005  Miyazaki .............. H02P 29/045
                                                            318/434
(Continued)

FOREIGN PATENT DOCUMENTS

JP      H7143606 A      6/1995
JP      201385474 A     5/2013
(Continued)

OTHER PUBLICATIONS

International Search Report in PCT/JP2020/001454, dated Feb. 10, 2020. 4pp.

*Primary Examiner* — Erick D Glass
(74) *Attorney, Agent, or Firm* — HAUPTMAN HAM, LLP

(57) ABSTRACT

A control device includes: an angular velocity detection unit that detects an angular velocity of a motor; a vibration component removal unit that removes a vibration component in a predetermined band from the angular velocity detected by the angular velocity detection unit by filtering; and a current command calculation unit that calculates a current command value of a drive current for driving the motor according to a torque command value and the angular velocity from which the vibration component has been removed by the vibration component removal unit.

5 Claims, 5 Drawing Sheets

2A : position detection unit    61 : current command calculation unit
5  : power conversion unit     62 : current control calculation unit
20 : speed calculation unit

(51) Int. Cl.
*H02P 23/04* (2006.01)
*H02P 21/22* (2016.01)
*H02P 23/16* (2016.01)
*H02P 6/10* (2006.01)

(58) Field of Classification Search
USPC .......................................................... 318/437
See application file for complete search history.

(56) References Cited

U.S. PATENT DOCUMENTS

| | | | |
|---|---|---|---|
| 2017/0217484 A1* | 8/2017 | Toda | B62D 5/046 |
| 2019/0002019 A1* | 1/2019 | Tsubaki | B62D 5/0463 |
| 2019/0193782 A1* | 6/2019 | Tsubaki | B62D 6/007 |
| 2019/0199267 A1* | 6/2019 | Fujiwara | H02P 29/00 |
| 2020/0010111 A1* | 1/2020 | Tsubaki | B62D 5/0463 |

FOREIGN PATENT DOCUMENTS

| | | |
|---|---|---|
| JP | 2016088106 A | 5/2016 |
| JP | 2017225278 A | 12/2017 |

* cited by examiner

CONTROL DEVICE

CROSS-REFERENCE TO RELATED APPLICATIONS

This is the U.S. national stage of application No. PCT/JP2020/001454, filed on Jan. 17, 2020, and priority under 35 U.S.C. § 119(a) and 35 U.S.C. § 365(b) is claimed from Japanese Patent Application No. 2019-068241, filed on Mar. 29, 2019.

FIELD OF THE INVENTION

The present invention relates to a control device that performs drive control of a motor.

BACKGROUND

In a control device that drives a motor, unnecessary vibrations occur if a drive current of the motor includes a vibration component. For example, in a device for driving a manipulator of a robot or a vehicle, the device has low rigidity and a low resonant frequency. In order to suppress the vibration, non-interference control is sometimes used to control the drive current of the motor. However, there is a case where an angular velocity of the motor itself includes a vibration component, and this vibration component causes the vibration in torque of the motor.

In a conventional technique, gain adjustment is performed on an angular velocity of a motor used for non-interference control. As a result, a vibration of the motor angular velocity is decreased to reduce a vibration of a motor torque. In addition, in another conventional technique, a variation amount of an output torque of a motor is estimated based on a detection value of a vehicle speed, and a torque command is corrected. In the correction of the torque command, a motor angular velocity subjected to averaging processing is used. As a result, a vibration of the torque command caused by a vibration of the motor angular velocity is reduced.

In a case where the averaging processing is performed to reduce the vibration component of the motor angular velocity, a difference from an actual motor angular velocity sometimes occurs when a sudden angular velocity change occurs. For this reason, there is a case where an error occurs when the vibration component of the motor angular velocity is calculated so that the responsiveness deteriorates, and an effect of suppressing the vibration is not sufficient.

SUMMARY

In order to solve the above problems, an exemplary control device according to the present invention includes an angular velocity detection unit, a vibration component removal unit, and a current command calculation unit. The angular velocity detection unit detects an angular velocity of a motor. The vibration component removal unit removes a vibration component in a predetermined band from the angular velocity detected by the angular velocity detection unit by filtering. The current command calculation unit calculates a current command value of a drive current for driving the motor according to a torque command value and the angular velocity from which the vibration component has been removed by the vibration component removal unit.

The above and other elements, features, steps, characteristics and advantages of the present disclosure will become more apparent from the following detailed description of the preferred embodiments with reference to the attached drawings.

DETAILED DESCRIPTION

Hereinafter, an embodiment for carrying out the present invention will be described in detail with reference to the accompanying drawings.

Figure 1:
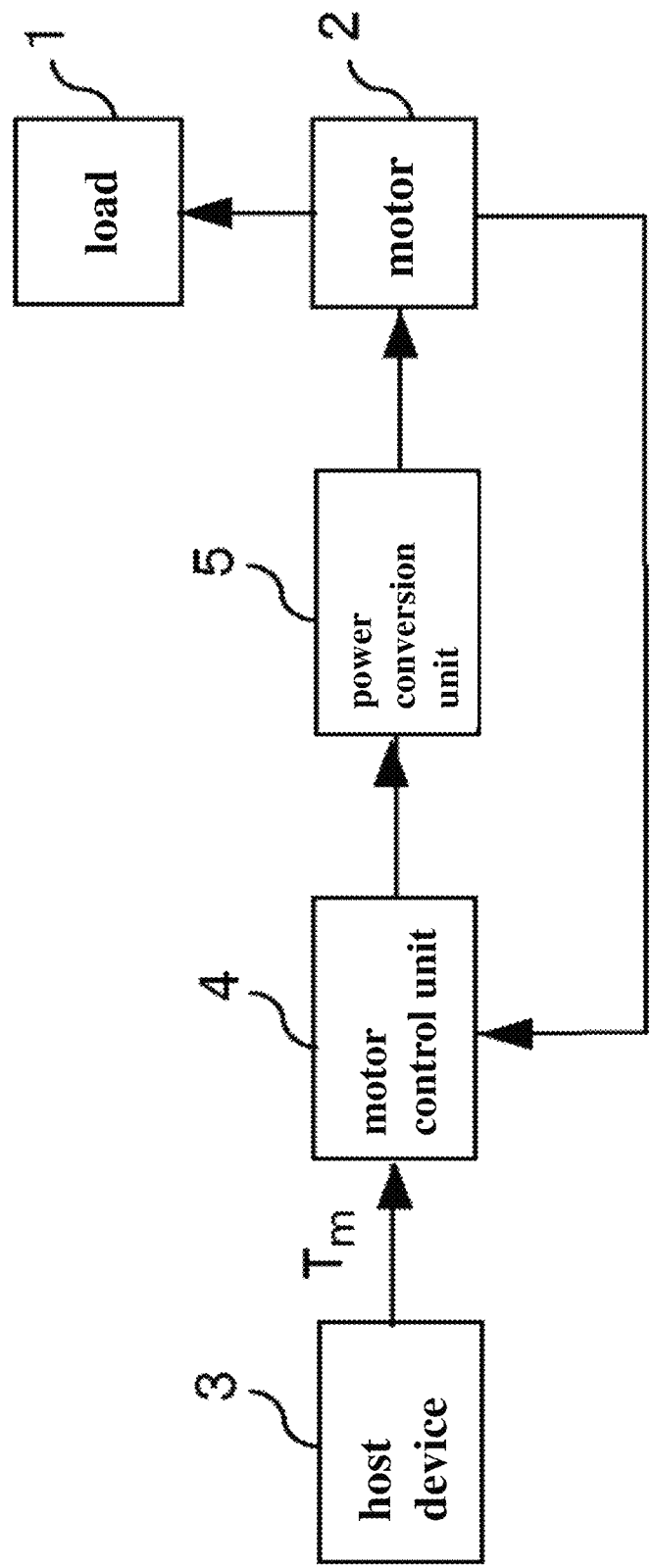
FIG. 1 is a block diagram illustrating a configuration example of a motor control system using a control device according to an embodiment.

FIG. 1 is a block diagram illustrating a configuration example of a motor control system using a control device according to an embodiment of the present invention.

The motor control system includes: a motor 2 to be controlled that drives a load 1; a host device 3 that generates a host torque command value for the motor 2; a motor control unit 4 that controls driving of the motor according to a host torque command value $T_m$ from the host device 3 and a state of the motor 2; and a power conversion unit 5 that supplies a drive current according to control of the motor control unit 4 to the motor 2.

The motor 2 drives, for example, an electric vehicle, and is configured using, for example, a three-phase brushless motor. In addition, for example, in the case of the electric vehicle, the host device 3 is configured using a vehicle control unit (VCU) or the like that generates the host torque command value according to an accelerator opening degree, a current vehicle speed, or the like. Note that the motor 2 may be a motor or the like that drives an armor the like of a robot. In addition, the motor 2 may be configured using another motor such as a brushed DC motor. In addition, the power conversion unit 5 is configured using, for example, an inverter, and performs switching of a power supply voltage according to current control from the motor control unit 4 to supply the power supply voltage to the motor 2.

Figure 2:
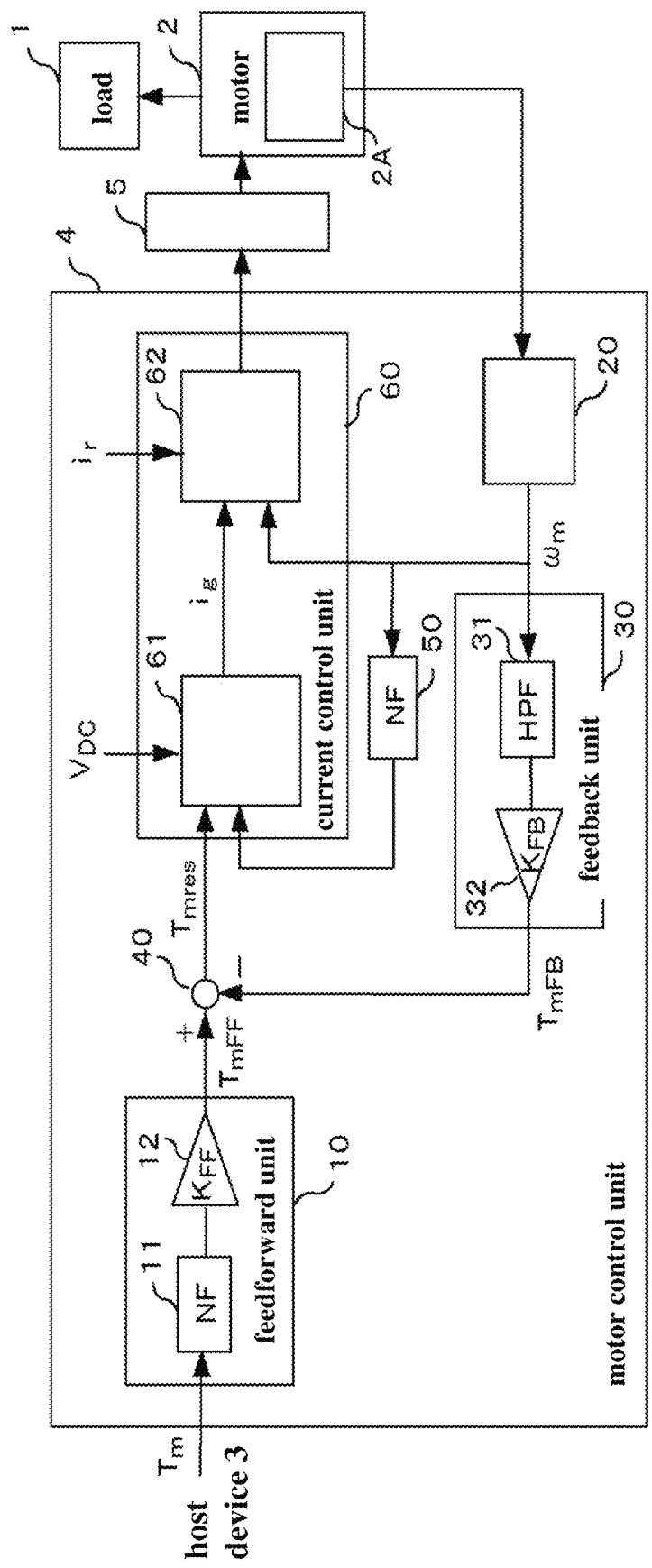
FIG. 2 is a block diagram illustrating a configuration example of a motor control unit forming the motor control system.

FIG. 2 is a block diagram illustrating a configuration example of the motor control unit 4. The motor 2 includes a field coil that generates a magnetic field according to the drive current supplied from the power conversion unit 5, a permanent magnet attached to a rotor, and the like, and generates a driving force according to the magnetic field generated by the field coil. In addition, the motor 2 includes a position detection unit 2A that detects a position (angle) of the rotor.

The motor control unit 4 includes: a feedforward unit 10 that obtains a feedforward torque command value $T_{mFF}$ according to the host torque command value $T_m$ from the host device 3; a speed calculation unit 20 that obtains an angular velocity $\omega_m$ of the motor 2 from a detection output of the position detection unit 2A; a feedback unit 30 that obtains a feedback torque command value $T_{mFB}$ according to the angular velocity $\omega_m$ of the motor 2; and a calculation unit 40 that obtains a torque command value $T_{mres}$. In addition, the motor control unit 4 includes: a vibration component removal unit (NF: Notch Filter) 50 that removes a vibration component in a predetermined band of the angular velocity $\omega_m$ obtained by the speed calculation unit 20; and a current control unit 60 that controls the drive current to be supplied to the motor 2 according to the torque command value $T_{mres}$ and the like.

In this motor control system, the current control unit 60 performs control based on the torque command value $T_{mres}$, obtained from the torque command value $T_{mFF}$ from the feedforward unit 10 and the torque command value $T_{mFB}$ from the feedback unit 30, thereby performing non-interference control to suppress the vibration of the motor 2. The feedforward unit 10 includes: a noise removal unit (NF: Notch Filter) 11 that removes a component in a predetermined band of the host torque command value $T_m$ from the host device 3; and an amplifier 12. In addition, the feedback unit 30 further includes: a filter (HPF: High Pass Filter) 31 that passes components in the predetermined band or higher of the angular velocity $\omega_m$ of the motor 2 obtained by the speed calculation unit 20; and an amplifier 32.

Figure 3:
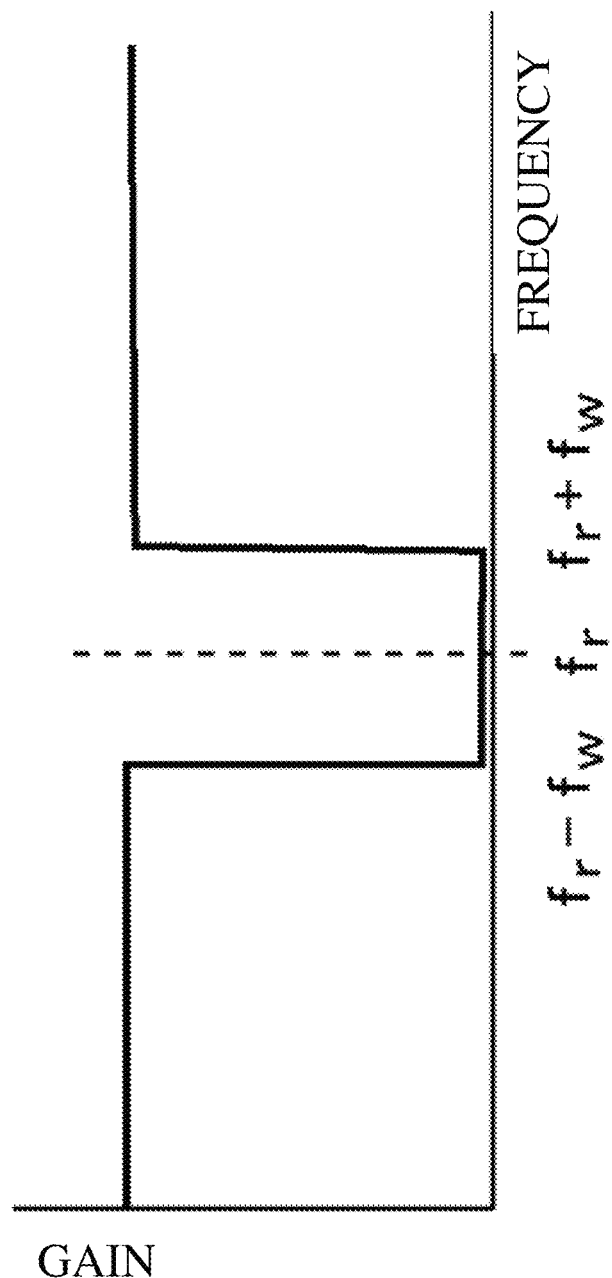
FIG. 3 is a view illustrating an example of characteristics of a vibration component removal unit forming the motor control unit.

For example, the NF 50 is configured using a notch filter having a characteristic of removing a signal in a specific band as illustrated in FIG. 3. The NF 50 removes a predetermined vibration component from the angular velocity $\omega_m$ obtained by the speed calculation unit 20. Specifically, the NF 50 removes vibration components of bands $f_r-f_w$ to $f_r+f_w$ having a predetermined width ($2f_w$) centered on a resonant frequency $f_r$ of a mechanical section, which includes the motor 2 and the load 1, from the angular velocity $\omega_m$ obtained by the speed calculation unit 20.

The current control unit 60 includes: a current command calculation unit 61 that obtains a current command value $i_g$ according to the torque command value $T_{mres}$ and the angular velocity $\omega_m$ of the motor 2 from which the vibration component in the predetermined band has been removed by the NF 50; and a current control calculation unit 62 that controls the drive current for driving the motor 2 according to the current command value $i_g$ and the angular velocity $\omega_m$ of the motor 2 obtained by the speed calculation unit 20. The current control calculation unit 62 performs pulse width modulation (PWM) control of the drive current by controlling the power conversion unit 5 according to the current command value $i_g$, for example.

In the motor control system configured as described above, when the host torque command value $T_m$ is supplied from the host device 3, the motor control unit 4 controls driving of the motor 2 according to the host torque command value $T_m$ and the angular velocity $\omega_m$ of the motor 2. Specifically, the feedforward unit 10 obtains the feedforward torque command value $T_{mFF}$ according to the host torque command value $T_m$ from the host device 3, and supplies the feedforward torque command value $T_{mFF}$ to the calculation unit 40. The speed calculation unit 20 obtains the angular velocity $\omega_m$ of the motor 2 from a detection output of the position detection unit 2A, and supplies the angular velocity $\omega_m$ to the feedback unit 30 and the like. The feedback unit 30 obtains the feedback torque command value $T_{mFB}$ from the angular velocity $\omega_m$ of the motor 2 and supplies the feedback torque command value $T_{mFB}$ to the calculation unit 40. The calculation unit 40 supplies a difference between the feedforward torque command value $T_{mFF}$ and the feedback torque command value $T_{mFB}$ to the current command calculation unit 61 as the torque command value $T_{mres}$.

The NF 50 removes a predetermined vibration component from the angular velocity $\omega_m$ obtained by the speed calculation unit 20 and supplies the resultant to the current command calculation unit 61. The current command calculation unit 61 obtains the current command value $i_g$ from the torque command value $T_{mres}$ supplied from the calculation unit 40, the angular velocity $\omega_m$ obtained by removing the predetermined vibration component and supplied via the NF 50, and a power supply voltage value $V_{DC}$, and supplies the current command value $i_g$ to the current control calculation unit 62. The current control calculation unit 62 controls the power conversion unit 5 according to the current command value $i_g$ supplied from the current command calculation unit 61. Specifically, the current control calculation unit 62 controls a timing at which the power conversion unit 5 performs switching according to a current value $i_r$ of the current supplied to the power conversion unit 5, the current command value $i_g$ from the current command calculation unit 61, and the angular velocity $\omega_m$ from the speed calculation unit 20. As a result, the drive control according to the host torque command value $T_m$ from the host device 3 and the angular velocity $\omega_m$ of the motor 2 is executed.

Figure 4:
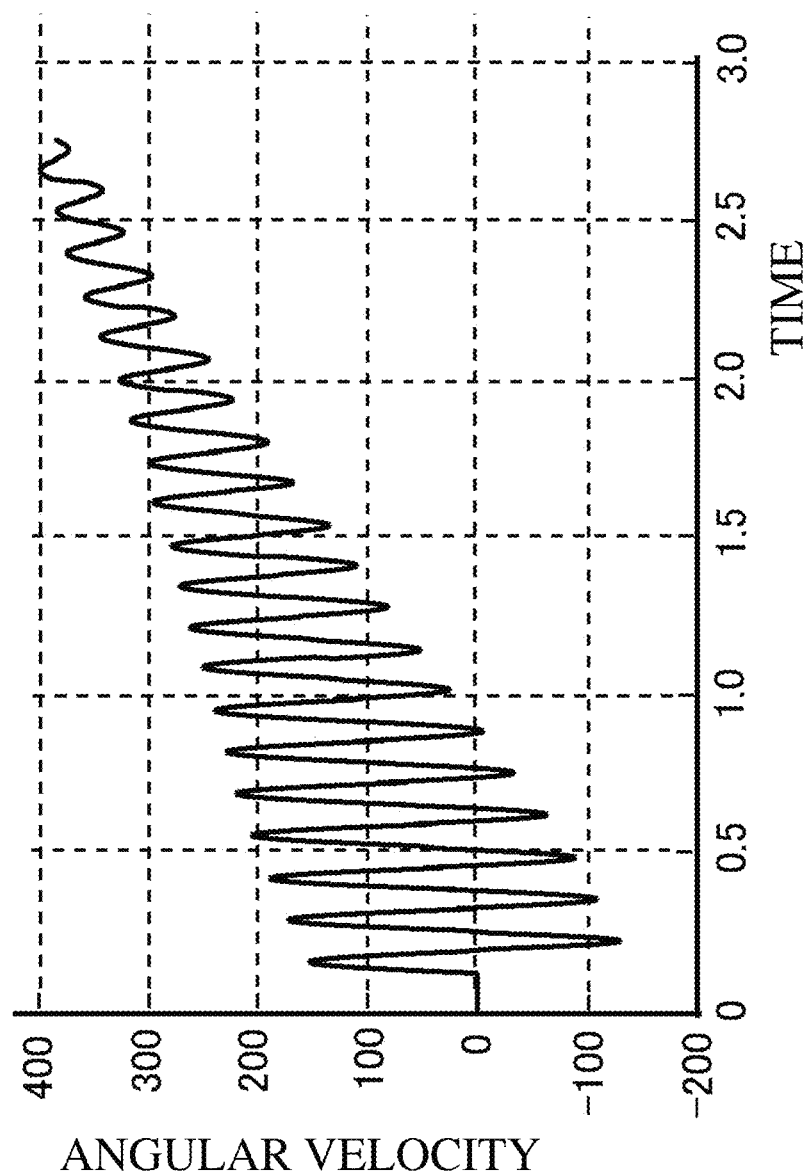
FIG. 4 is a view illustrating an example of an angular velocity obtained by a speed calculation unit.

FIG. 4 is a view illustrating an example of the angular velocity $\omega_m$ of the motor 2 obtained by the speed calculation unit 20.

Figure 5:
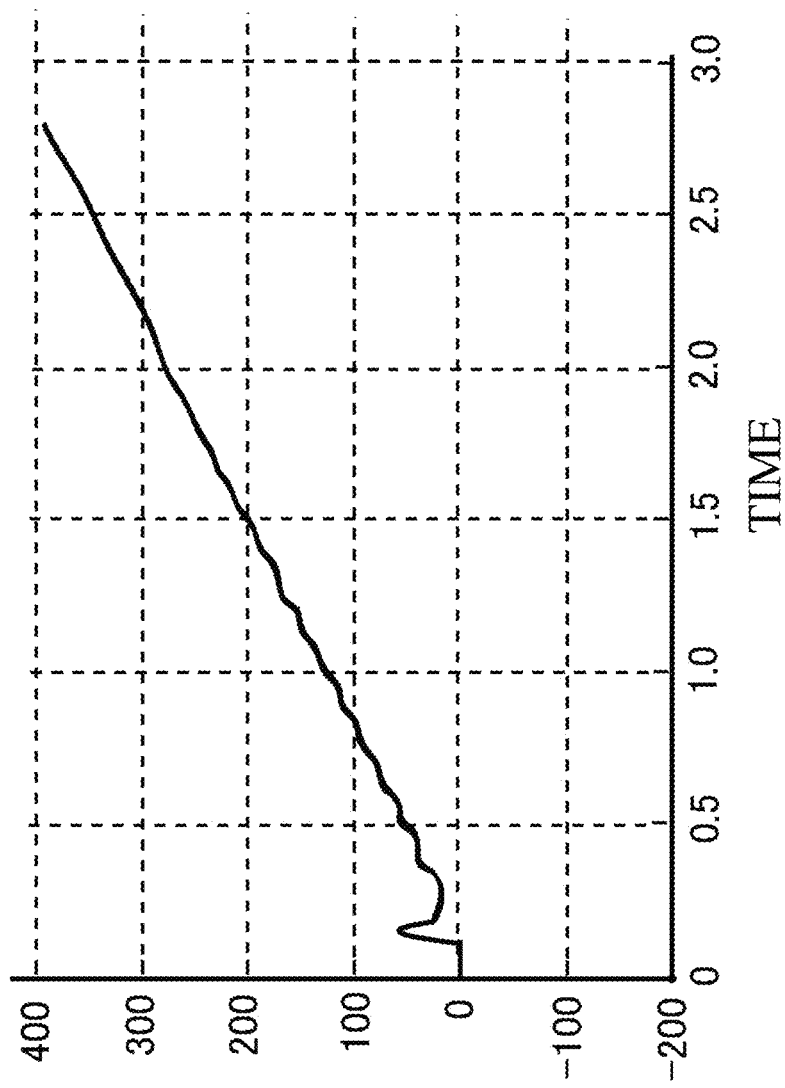
FIG. 5 is a view illustrating an example of an angular velocity from which a vibration component has been removed by the vibration component removal unit.

As illustrated in FIG. 4, the angular velocity $\omega_m$ of the motor 2 includes a vibration component. If the current command value $i_g$ is obtained by the current command calculation unit 61 directly using the angular velocity $\omega_m$, the current command value $i_g$ also includes a vibration component. In particular, if a component having a frequency close to the resonant frequency $f_r$ of the mechanical section including the motor 2, the load 1, and the like is included, a strong vibration occurs due to resonance. For this reason, the vibration component is removed from the angular velocity $\omega_m$ of the motor 2 by the NF 50 in this motor control system. As a result, the angular velocity $\omega_m$ supplied from the NF 50 to the current command calculation unit 61 is the angular velocity $\omega_m$ from which the vibration component has been removed, for example, as illustrated in FIG. 5. Since the current command value $i_g$ is obtained by the current command calculation unit 61 using such an angular velocity $\omega_m$, it is possible to suppress the vibration in the drive control of the motor without impairing control responsiveness.

In addition, in the motor control system, the current control calculation unit 62 performs current control for driving the motor 2 according to the current command value $i_g$ obtained by the current command calculation unit 61 and the angular velocity $\omega_m$ of the motor 2 obtained by the speed calculation unit 20. In this manner, the control based on the actual angular velocity $\omega_m$ of the motor 2 can be performed in the current control in the current control calculation unit 62 by using the angular velocity $\omega_m$ of the motor 2 obtained by the speed calculation unit 20, that is, the actual angular velocity $\omega_m$ of the motor 2 from which the vibration component is not removed. As a result, it is possible to suppress generation of a vibration caused by inconsistency with the actual angular velocity $\omega_m$ of the motor 2, and to efficiently suppress the vibration.

As described above, it is possible to remove the vibration component in the calculation of the current command value and to suppress the vibration in the drive control of the motor without impairing the control responsiveness by removing the vibration component from the angular velocity of the motor used for the non-interference control according to the present embodiment. In addition, the vibration component is removed from the angular velocity by the notch filter in the present embodiment, and thus, it is possible to reduce a delay in response caused by removal processing as compared with a case where a vibration component is removed using a moving average, a low-pass filter, or the like. In addition, the motor angular velocity used for the current control calculation directly uses a detection value of the motor angular velocity in the present embodiment. That is, the motor angular velocity used for the non-interference control can avoid inconsistency with the actual angular velocity of the motor, the accuracy of the non-interference control can be improved, and the vibration can be efficiently suppressed.

The above-described embodiment is an example as a means for implementing the present invention, and should be appropriately modified or changed according to a configuration of a device or a system to which the present invention is applied or various conditions, and the present invention is not limited to the above-described embodiment.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A control device comprising:
    an angular velocity detection unit configured to detect an angular velocity of a motor;
    a vibration component removal unit configured to remove a vibration component in a predetermined band from the angular velocity detected by the angular velocity detection unit by filtering to obtain a first angular velocity; and
    a current command calculation unit configured to calculate a current command value of a drive current for driving the motor by using (i) a torque command value and (ii) the first angular velocity.

2. The control device according to claim 1, wherein
    the vibration component removal unit includes a notch filter configured to remove the vibration component from the angular velocity detected by the angular velocity detection unit.

3. The control device according to claim 1, wherein
    the vibration component removal unit is configured to remove the vibration component in the predetermined band including a resonant frequency of the motor from the angular velocity detected by the angular velocity detection unit.

4. The control device according to claim 1, further comprising:
    a feedback unit configured to obtain a feedback value from the angular velocity detected by the angular velocity detection unit;
    a feedforward unit configured to obtain a feedforward value according to a host torque command value supplied from a host device; and
    a torque command calculation unit configured to obtain the torque command value according to the feedback value obtained by the feedback unit and the feedforward value obtained by the feedforward unit.

5. The control device according to claim 1, further comprising:
    a current control calculation unit configured to control the drive current to be supplied to the motor according to the angular velocity detected by the angular velocity detection unit and the current command value obtained by the current command calculation unit.

* * * * *